July 26, 1955  R. O. GNAGY  2,713,741
AUTOMATIC FISH CATCHING APPARATUS
Filed Aug. 26, 1952  2 Sheets-Sheet 1
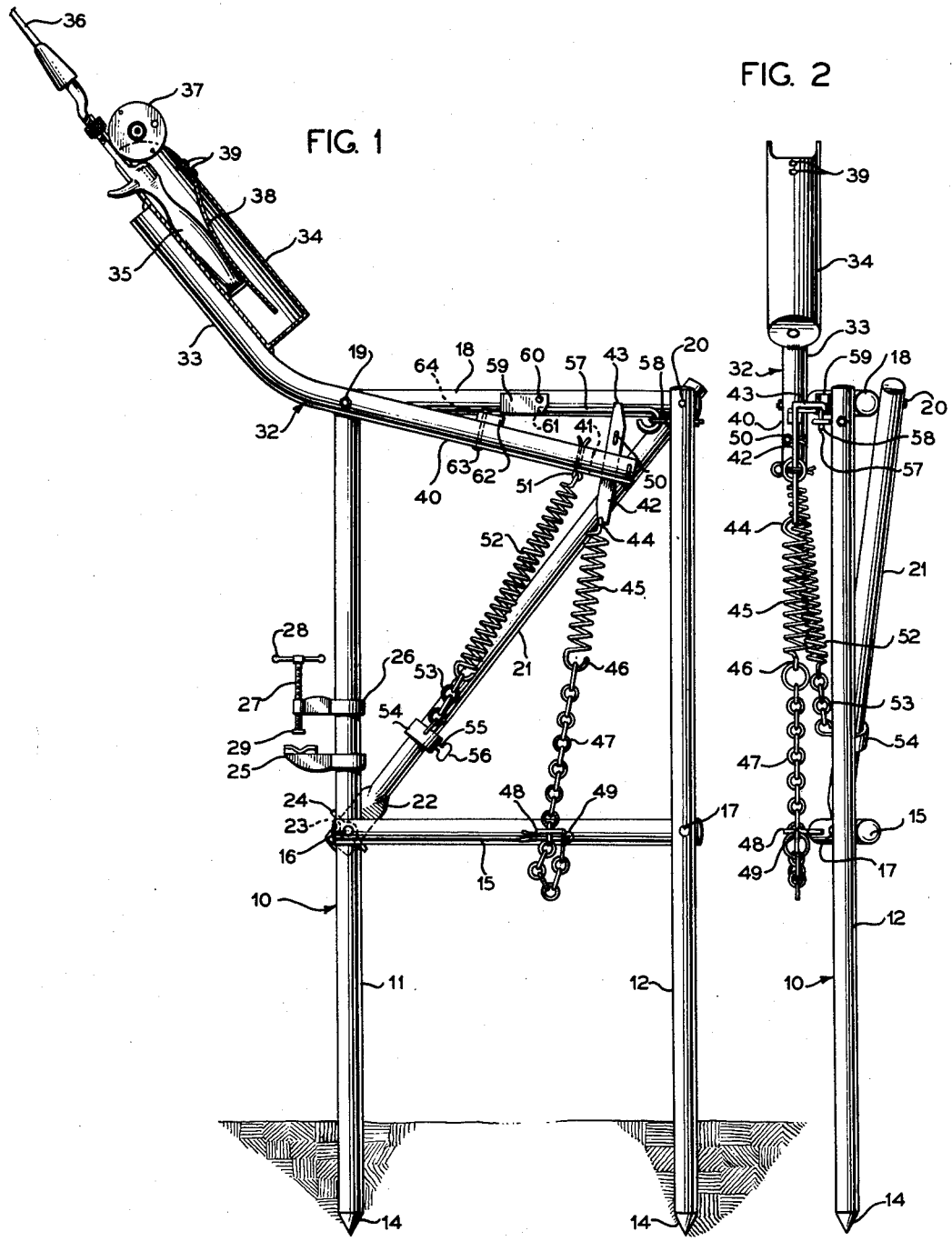
INVENTOR
R. O. GNAGY
BY
A. Yates Dowell
ATTORNEY July 26, 1955 R. O. GNAGY 2,713,741
AUTOMATIC FISH CATCHING APPARATUS
Filed Aug. 26, 1952 2 Sheets-Sheet 2
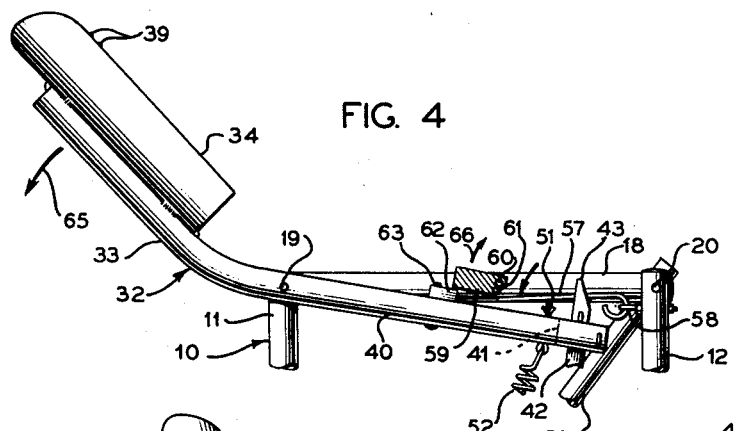
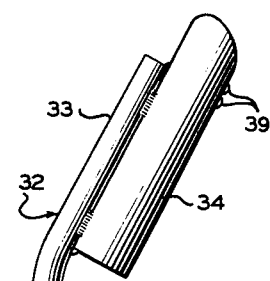
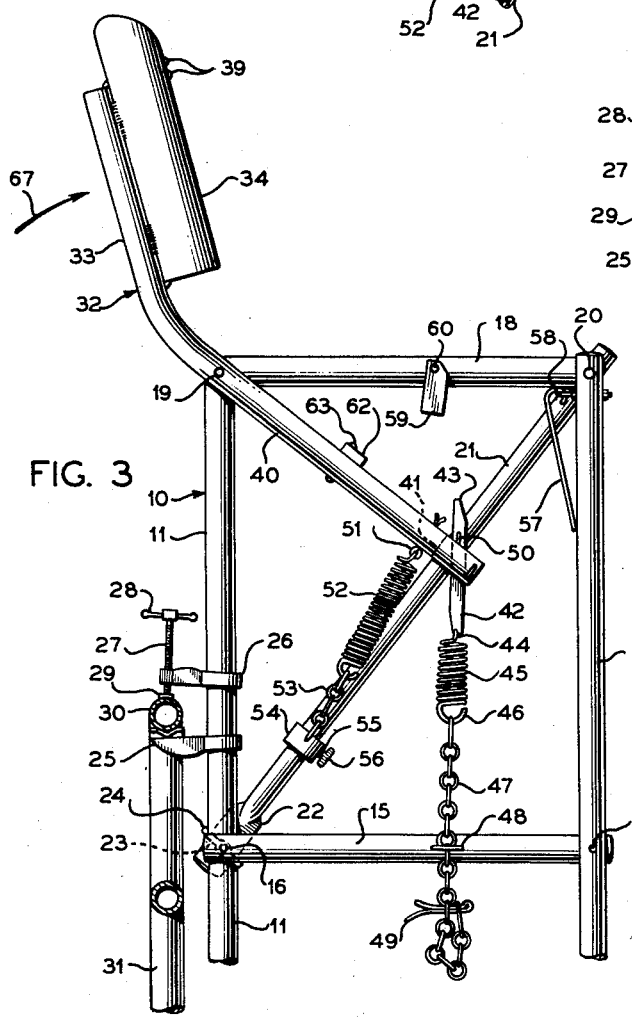
INVENTOR
R. O. GNAGY
BY *A. Yates Dowell*
ATTORNEY

United States Patent Office 2,713,741
Patented July 26, 1955

2,713,741

AUTOMATIC FISH CATCHING APPARATUS

Raymond Oliver Gnagy, Hutchinson, Kans.

Application August 26, 1952, Serial No. 306,354

8 Claims. (Cl. 43—15)

This invention relates to fishing and more particularly to a portable collapsible apparatus for supporting a fishing rod and tackle and for automatically moving the rod upwardly in a relatively violent manner in response to a bite.

Heretofore numerous devices of this nature have been proposed but in the main these have been large and cumbersome and also were comparatively costly. These prior devices were furthermore relatively insensitive in that they did not detect and operate in response to a light bite or nibble which frequently resulted in losing a fish and the bait. This arose by reason of the fact that no means were provided for compensating for the weight of the rod and tackle and therefore the device was constructed to operate with the heaviest rod and tackle likely to be used. Consequently when lighter rods and tackle were utilized the device would not respond to a relatively light pull on the line. As a result of these drawbacks the prior art devices have not found particular favor with the fishing fraternity.

As is well known, non-commercial fishermen usually engage in this activity both for the sport and for relaxation, however, as is well known it often becomes very tiresome to hold a relatively heavy rod for a considerable period of time while waiting for a bite. Consequently it has been rather common practice to support the rod in some convenient manner from a fixed support such as the ground and watch the tip of the rod or a float for evidence of bites at which time the fisherman takes the rod and attempts to hook the fish. However this method still necessitates a relatively close attention to the rod and does not permit full relaxation by the fisherman. Consequently any apparatus which will both support the rod and automatically operate to hook and catch the fish represents a definite step forward in the art and this is particularly true where the apparatus may be adjusted to maintain the same sensitivity regardless of the weight of the rod and tackle utilized.

It is accordingly an object of this invention to provide an automatic fish catching apparatus in the form of a portable collapsible device which will operate to support a rod and to automatically hook and catch a fish in response to a bite or pull on the line.

It is a further object of the invention to provide an automatic fish catching apparatus which may be either supported by embedding the same in the earth or which may be conveniently clamped to a fixed object such as a boat or the framework of a bridge or the like.

It is a further object of the invention to provide an automatic fish catching apparatus which may be adjusted automatic fish catching apparatus which may be adjusted to compensate for various weights of rods and tackle in order to maintain the sensitivity of the device which will result in the operation thereof in response to a particularly light bite or nibble.

A still further object of the invention is the provision of a portable collapsible automatic fish catching apparatus which may be conveniently constructed from readily available materials without requiring the use of skilled labor and which results in the provision of such a device at a relatively low cost.

It is a further object of the invention to provide a portable collapsible fish catching apparatus which may be folded into a collapsed condition for convenient carrying by merely releasing a single thumb screw or other fastening means, erection of the device being accomplished by merely securing such fastening means.

Another object of the invention is the provision of an automatic fish catching apparatus in which the power for raising the rod to hook the fish may be adjusted in accordance with the weight and size of fish which it is anticipated will be caught.

Further objects and advantages of the invention will be apparent from the following description taken in conjunction with the accompanying drawings, wherein:

Fig. 1 is an elevational view of the automatic fish catching apparatus of this invention in operative position;

Fig. 2, a side elevational view of the automatic fish catching apparatus as shown in Fig. 1;

Fig. 3, a fragmentary elevational view similar to Fig. 1 but showing the operative portions of the device in position after catching a fish and further showing auxiliary supporting means for securing the device to a structure such as a boat or bridge;

Fig. 4, a fragmentary elevational view showing in detail the trigger mechanism for retaining the device in a cocked position and showing such parts immediately subsequent to tripping of the same; and Fig. 5, an elevational view showing the automatic fish catching apparatus of this invention in collapsed condition.

With continued reference to the drawing the automatic fish catching apparatus of this invention may conveniently comprise a frame 10 made up of spaced side members 11 and 12 which may be provided with pointed lower extremities 13 and 14 to facilitate penetration of the earth by such members 11 and 12. Side members 11 and 12 are joined together by a lower cross member 15 which is pivotally secured to side member 11 by a rivet or other suitable means 16 and is likewise pivotally secured to side member 12 by a rivet or other suitable means 17. Side members 11 and 12 are also joined together at their upper extremities by an upper cross member 18 which is secured to side member 11 by a rivet or other suitable fastening means 19 and to side member 12 by a rivet or other suitable fastening means 20.

A diagonal brace member 21 is pivotally secured to side member 12 and upper cross member 18 by the same rivet or other fastening means 20 which secured upper cross member 18 to side member 12 and the opposite end of diagonal brace member 21 is provided with a flattened portion 22 having a slot 23 therein for receiving the fastening means 16. Fastening means 16 is provided on one end thereof with a screw threaded wing nut or the like 24 which may be utilized to clamp the diagonal brace 21 in the position shown in Fig. 1 in which case the frame 10 is in erected condition and ready for use. In the event it is desired to collapse the frame for carrying the same the wing nut 24 is loosened to permit pivotal movement of the diagonal brace 21 about the rivet 20 toward the side member 12 and likewise the side member 11 may be moved upwardly and inwardly toward the side member 12 to collapse the frame and all parts carried thereby as best shown in Fig. 5.

Since it is sometimes desirable to utilize the apparatus of this invention in a boat or to secure the same to a fixed structure such as a bridge, means have been provided to accomplish this purpose in the form of an adjustable clamping means which comprises a fixed jaw 25 secured to the side member 11 and a movable jaw 26 which is slidably received on the side member 11. Movable jaw 26 is also provided with a clamp screw 27 having a finger engaging handle 28, the lower end 29 of the clamp screw 27 serving to engage a fixed structure such as a tubular member 30 which may form the part of a bridge structure or boat 31. As best shown in Fig. 3 the movable clamping jaw 26 is slidable on the side member 11 and is loosely received thereon. In installing the device on the tubular member 30 as shown in Fig. 3 the movable jaw 26 is positioned with the lower end 29 of the clamping screw 27 in engagement with the tubular member 30 and upon the rotation of the clamping screw 27 by the finger engaging handle 28 the movable jaw 26 will tilt as shown in Fig. 3 to securely lock the same in position on the side member 11 and prevent upward movement thereof. This will result in securely clamping the device in place wherever desired.

A fishing rod supporting arm 32 is pivotally mounted adjacent its mid point on the rivet or other fastening means 19 which serves to secure the upper cross member 18 to the side member 11. The outer end 33 of the arm 32 is provided with a socket 34 for receiving the butt 35 of a conventional rod 36. Rod 36 may be provided with a conventional reel 37 but this reel is only utilized after the fish has been hooked by the apparatus of this invention in a manner to be later described. In order to releasably secure the butt 35 in the socket 34 a leaf spring 38 may be secured at 39 to the socket 34, the spring extending inwardly and rearwardly of the socket 34 to frictionally engage the butt 35 and prevent inadvertent removal of the same from the socket 34. However upon hooking a fish it is only necessary for the fisherman to grasp the rod 36 and remove the same from socket 34 by an outward pull thereon and likewise replacement of the butt 35 within the socket 34 may be conveniently accomplished by simply inserting the same therein against the action of leaf spring 38.

The inner end 40 of arm 32 is provided adjacent the end thereof with a slot 41 which serves to slidably receive an elongated pawl 42 provided at its upper end with a laterally extending hook 43 and being connected at its lower end to one end 44 of a tension spring 45. The opposite end 46 of tension spring 45 is connected to a chain 47 which passes downwardly through an eye 48 extending from the lower cross member 15, the end of chain 47 being provided with a cotter key 49 or other suitable means which may be inserted through one of the links 47 below the eye 48 and as shown in Fig. 1 this will prevent upward movement of the chain 47 through the eye 48 and thus adjust the tension on the spring 45. Spring 45 provides a power means for pivotally moving the arm 32 about the pivot 19 in order to raise the rod 36 as will be presently described. Pawl 42 is also provided with a pin or the like 50 above the inner end 40 of the arm 32, this pin forming an abutment the purpose of which will presently appear.

Also secured to the inner end 40 of arm 32 by a cotter key or the like 51 is a tension spring 52 the opposite end of which is connected by a chain or other suitable flexible means 53 to a collar 54 slidably received on the diagonal brace 21. Collar 54 is clamped in adjusted position on the diagonal brace 21 by a set screw 55 threadedly received therein and engaging the surface of brace 21, set screw 55 being also provided with a finger engaging knob 56 for convenient manipulation of the same. Spring 52 serves to counterbalance the weight of the outer end 33 of the arm 32, the rod 36 and tackle carried thereby and spring 52 is adjusted by moving the collar 54 in a manner to compensate for this weight and to retain the sensitivity of the device. The manner of making such an adjustment will be described in connection with the description of the operation of the device.

A latching mechanism for retaining the arm 32 in cocked position is provided in the form of a latch bar 57 pivotally secured by an eye 58 to the side member 12. A trigger in the form of an elongated block 59 is pivotally mounted at 60 on the upper cross member 18 and the trigger 59 is provided in one end thereof adjacent the pivot point 60 but below the same with a recess 61 for receiving the end of latch bar 57 when in latched position. A trigger actuating means in the form of a block 62 is pivotally mounted at 63 on the upper side of the inner end 40 of the arm 32.

When it is desired to utilize the automatic fish catching apparatus of this invention the frame 10 is erected to the position shown in Fig. 1 by moving the side members 11 and 12 away from each other until the lower cross member 15 is substantially parallel to the upper cross member 18 and in a horizontal position at which time the slot 23 in the lower end of diagonal brace member 21 may engage the fastening means 16 and the wing nut 24 tightened to securely hold the diagonal brace 21 in place. This results in providing a rigid frame 10 and the pointed ends 13 and 14 may be embedded in the ground by applying weight to the upper end of the frame or by the fisherman stepping on the lower cross member 15. Also if desired the frame 10 may be secured to a boat or other fixed structure by utilizing the clamping means comprising the jaws 25 and 26 as well as the clamp screw 27.

The fishing rod 36 having the tackle to be utilized rigged thereon is inserted in the socket 34 in engagement with the spring 38 to securely hold the same in place and the collar 54 is adjusted on the diagonal brace member 21 until the weight of the outer end 33 of the arm 32, the rod 36 and the tackle carried thereby is counterbalanced whereby the slightest downward force on the outer end of rod 36 will move the inner end 40 of arm 32 upwardly against the action of spring 52 which is a relatively light spring. Upon completion of this adjustment the apparatus is ready to be cocked and placed in operative condition.

During the cocking operation the trigger actuating means comprising the block 62 is rotated to the dotted line position 64 shown in Fig. 1 and the end of the latch bar 57 is engaged in the recess 61 in the trigger 59 by pivotally moving the trigger 59 in a clockwise direction as viewed in Figs. 1 and 4 and reversing the pivotal movement of the same to insert the end of the latch bar 57 in the recess 61. Thereupon the outer end 33 of the arm 32 is moved downwardly and the upper side of the inner end 40 of the arm 32 engages the abutment 50 on the pawl 52 to tension the power spring 45 and move the hook 43 on the pawl 42 upwardly to a position where the same will engage over the latch bar 57. Because of the engagement of the end of latch bar 57 in the recess 61 of trigger 59 downward movement of the pawl 42 and the inner end 40 of arm 32 will be prevented.

Since the weight of the rod and tackle has been counterbalanced by adjustment of the spring 52 the inner end 40 of the arm 32 will float between the abutment 50 and the upper end 44 of spring 45 in the position shown in Fig. 1. Upon completion of this cocking operation the trigger actuating block 62 is moved to the full line position shown in Figs. 1 and 4 and upon a bite being received on the line carried by the rod 36 the outer end 33 of the arm 32 will move downwardly in the direction of the arrow 65 as shown in Fig. 4 to bring the trigger actuating block 62 into engagement with the trigger 59 and move the same in the direction of the arrow 66 as shown in Fig. 4 to release the end of the latch bar 57 from the recess 61. This permits the hook 43 of the pawl 42 to become disengaged from the latch bar 57 whereupon the pawl 42 moves downwardly and the abutment 50 engages the inner end 40 of the arm 32 to move the outer end 33 and the rod 36 carried thereby violently upward in the direction of the arrow 67 in Fig. 3 to hook the fish.

At this time the apparatus will be in the position shown in Fig. 3 with the socket 34 and rod 36 in an upward position at which time the rod may be removed from the socket 34 and the fish reeled in. The line is then baited and cast into the water, the butt 35 of the rod 36 replaced in the socket 34 and the apparatus recocked to position for catching another fish. Since the counterbalancing spring 52 has once been adjusted for this particular fishing equipment further adjustment of the same will not be necessary until the rod or the tackle carried thereby is changed.

It will thus be seen that there has been provided by this invention a relatively simple and inexpensive automatic fish catching apparatus which may be conveniently supported either up on the ground or from a fixed structure such as a boat or bridge and which may be adjusted to compensate for various types of fishing tackle to retain the same relative sensitivity regardless of the comparative weights of such tackle. Furthermore the device may be collapsed for convenient portability and all of the parts may be made of sufficient size to preclude inadvertent damage thereto which might result in rendering the device inoperative. Obviously several of these devices may be utilized by one fisherman and likewise the apparatus may be constructed of any suitable material such as wood, metal, plastics or the like.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. An automatic fish catching apparatus including a frame, a fishing rod supporting arm pivotally mounted adjacent the mid point thereof on said frame, a rod receiving socket on the outer end of said arm for supporting a rod with tackle thereon, an elongated pawl slidably mounted in the inner end of said arm, said pawl terminating at the upper end thereof in a hook, abutment means on the pawl for limiting downward sliding movement of said pawl in said arm, power means for pivotally moving said arm and rod carried thereby comprising resilient means secured to said pawl and reactingly connected to said frame so as to bias the pawl downwardly, resilient counterbalancing means secured to said arm adjacent the inner end thereof and reactingly connected to said frame, means to adjust said counterbalancing means whereby the weight of said arm, said rod and the tackle carried thereby may be acurately counterbalanced, releaseable latch means for preventing movement of said arm by said power means through said pawl, and latch tripping means on said arm engageable with said latch in such a manner that upward movement of the inner end of said arm in response to a bite on said tackle will cause said tripping means to release said latch thus permitting movement of said pawl downwardly so that said abutment engaging said arm will cause a rapid upward movement of the outer end of said arm and rod thereby hooking the fish.

2. A fishing apparatus comprising a supporting frame, an arm pivotally mounted on said frame, a socket on said arm for supporting a rod with tackle thereon, adjustable counterbalancing means reacting between said arm and said frame and maintaining said arm in proper position for fishing, lost motion connecting means associated with said arm, power tensioning means connected at one end to said lost motion connecting means and at its other end to said frame in such a manner as to pivot said arm about its pivotal mounting, latch means on said frame engageable with an element of said lost motion connecting means to prevent said power means from moving said arm, trigger means for maintaining said latch means in position, said lost motion connecting means permitting said arm to move a limited amount without affecting said power means, and means on said arm in the path of said trigger means for operating said trigger means when a bite occurs on said tackle to release said latch thereby permitting said power means to pivot said arm and move said rod and tackle for securely hooking a fish.

3. The invention according to claim 1 wherein said releasable latch means includes a latch bar pivotally mounted on one end on said frame and a trigger pivotally mounted on said frame, said trigger having means for engaging the opposite end of the latch bar and wherein the tripping means includes a trigger actuating means.

4. The invention according to claim 2 in which the frame is collapsible.

5. The invention according to claim 1 in which the frame is collapsible.

6. The invention according to claim 1 in which the frame includes an upper cross member, a lower cross member, and a diagonal brace, and wherein the releasable latch means is connected to the upper cross member, the power means is connected to the lower cross member and one end of the resilient counter balancing means is adjustably connected to the diagonal brace whereby the tension in the counter balancing means may be varied.

7. The invention according to claim 1 in which the frame includes an upper cross member, a lower cross member, and a diagonal brace, and wherein the releasble latch means is connected to the upper cross member, the power means is adjustably connected to the lower cross member and one end of the resilient counter balancing means is adjustably connected to the diagonal brace whereby the tension in the counter balancing means may be varied.

8. The invention according to claim 1 in which the frame includes an upper cross member, a lower cross member and a diagonal brace and wherein the releasable latch means is connected to the upper cross member, the power means is connected to the lower cross member and one end of the resilient counter balancing means is connected to the diagonal brace.

References Cited in the file of this patent

UNITED STATES PATENTS

| 1,549,405 | Bjurstrom | Aug. 11, 1925 |
| 1,957,853 | Sibley | May 8, 1934 |
| 2,008,482 | Wolf | July 16, 1935 |
| 2,564,840 | Glenn | Aug. 21, 1951 |